Sept. 17, 1968  E. GERLACH  3,402,007
FILM FEEDING MECHANISM

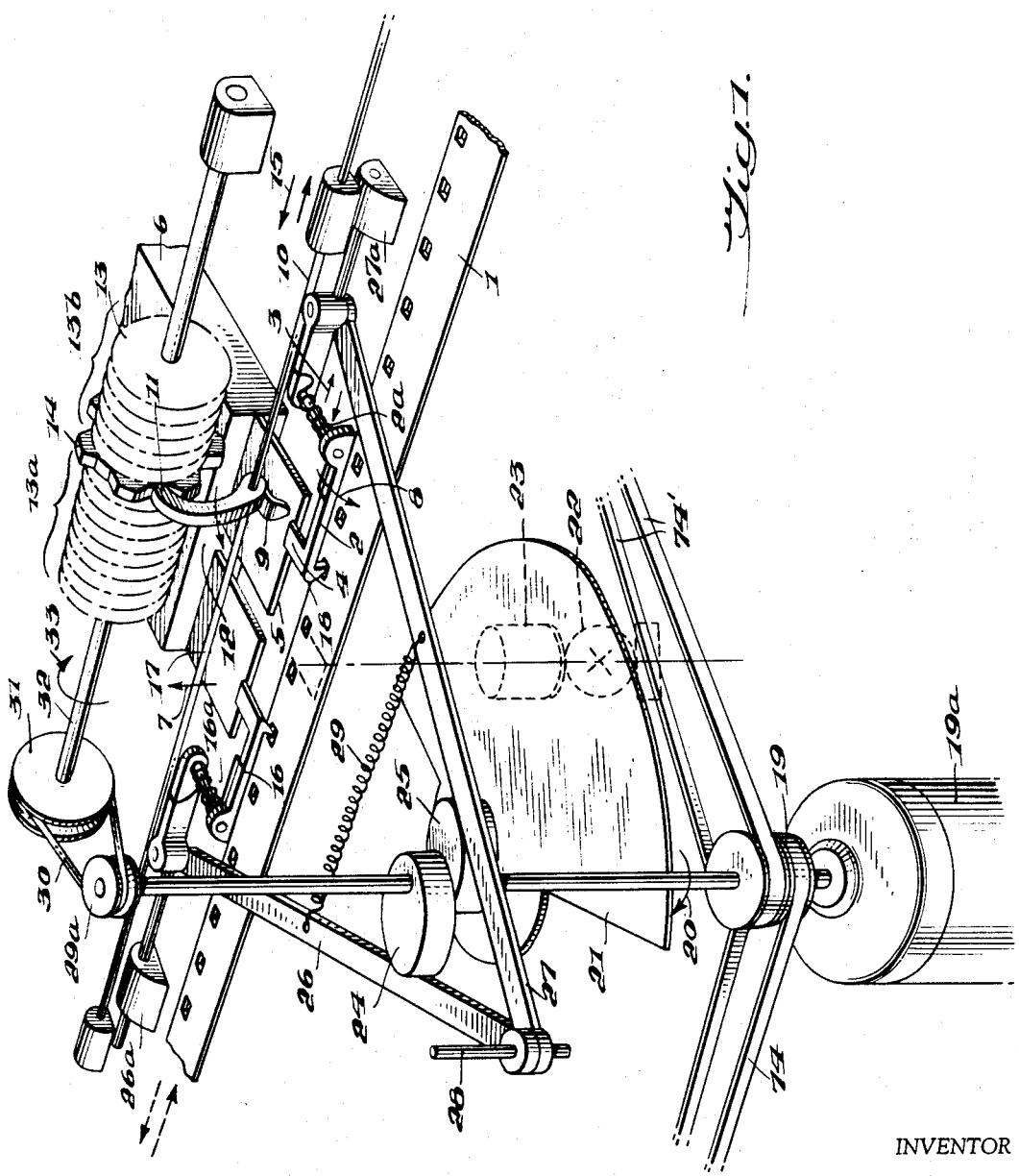

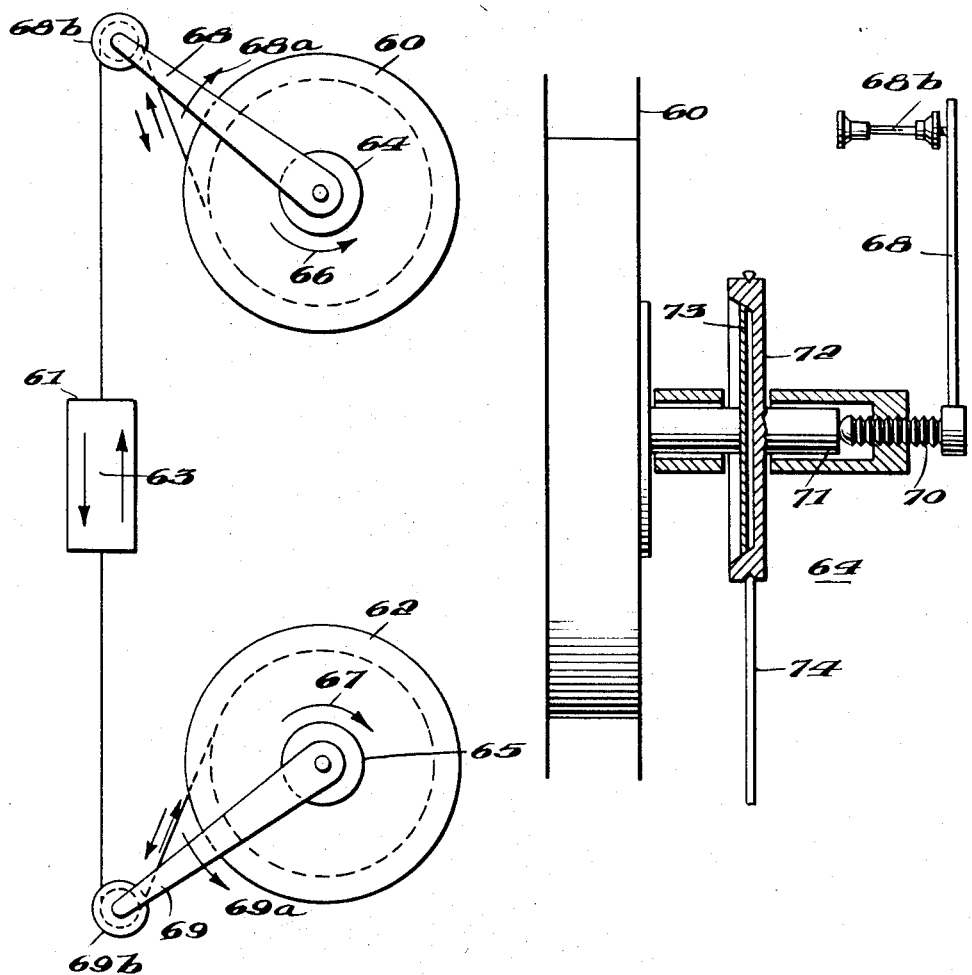

Original Filed July 20, 1961  3 Sheets-Sheet 3

INVENTOR
ERWIN GERLACH,
BY Lavoy and Taylor
ATTORNEYS

United States Patent Office 3,402,007
Patented Sept. 17, 1968

3,402,007
FILM FEEDING MECHANISM
Erwin Gerlach, Stockholm, Sweden, assignor, by mesne assignments, to Eastman Kodak Company, Rochester, N.Y., a corporation of New Jersey
Continuation of abandoned application Ser. No. 125,583, July 20, 1961. This application July 8, 1965, Ser. No. 480,218
Claims priority, application Sweden, June 15, 1955, 5,619/55
26 Claims. (Cl. 352—180)

This application is a continuation of my prior copending application Ser. No. 125,583 filed July 20, 1961, for "Intermittent Film Feed Mechanism," now abandoned, which in turn was a continuation-in-part of my prior application Ser. No. 591,330 filed June 14, 1956, for "Image Frequency Control in Film Reproduction," now abandoned.

This invention relates to film projectors, and particularly to a film feeding mechanism for motion picture projectors which is capable of varying the frequency of frame change in either forward or reverse direction and halting the film for still projection while the projector maintains a constant frame projection frequency and while the projector motor and associated elements move at a constant speed.

In the reproduction of a film strip on a screen by known projectors having intermittent film feed mechanisms, variation in the frequency of frame change has been possible to some extent through control of the speed of the projector motor, such as through the use of series variable resistors. However, this has been possible within only narrow limits of frequency change because of the flicker which results when, for example, there is a substantial decrease in the frequency of frame change. Furthermore, control by this method involves accelerating and/or retarding rotating masses, and thus such control is not instantaneous.

A primary object of the present invention is to provide an improved variable-rate film feed mechanism for film projectors which is capable of varying the frequency of frame change almost instantly over wide limits, including still projection, without stopping or varying the speed or direction of operation of the drive means for the feed mechanism and/or projector shutter.

Another object of the invention is to provide such an improved mechanism which is capable of reversing the direction of film feed substantially instantly without changing the direction or speed of, or stopping, the drive means, and which can achieve the aforesaid frequency variations during feeding of the film in either direction.

The novel features that I consider characteristic of my invention are set forth with particularity in the appended claims. The invention itself, however, both as to its organization and its operation, together with additional objects and advantages thereof, will best be understood from the following description when considered in connection with the accompanying drawings wherein:

FIG. 1 is a perspective view showing an intermittent film feed mechanism constructed in accordance with an exemplary preferred embodiment of the invention.

FIGS. 2 and 3 show the reel supply and take-up system by which the film tension is maintained within predetermined limits and by which instantaneous take-up is accomplished upon reversal of the film feed mechanism without involving a drive shift from one reel to another.

Figure 4:
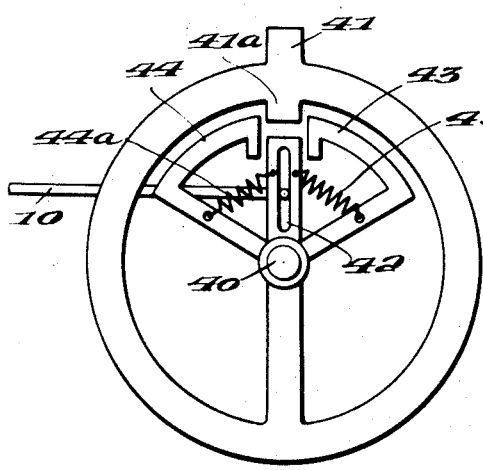
FIGS. 4–6 show exemplary details of a mechanism for effecting a shifting movement to accomplish a variation in the frequency of frame change.

Referring now to the drawings, particularly FIGURE 1, for purposes of clarity and simplification I have shown only those parts of a film projector which are essential to an understanding of the present invention. As shown in FIGURE 1, the film 1 is advanced intermittently by means of a catcher 2 which reciprocates in the directions indicated by the arrows 3. Any convenient form of mechanism for effecting the reciprocal movement of catcher 2 may be utilized, and an exemplary form as illustrated in the drawing will be described in detail below. The catcher 2 has a finger 4 which slides on a leaf spring 5 during the reciprocal movement of the catcher. The leaf spring 5 is fastened in a holder 6 and disposed so as to move the catcher 2 upwardly in the direction of arrow 7 away from the film 1 and against the weaker spring action of the helical spring 2a which is wound about the shaft carrying the catcher 2 and urging the catcher in the direction of the arrow 8, that is, into engagement with the film 1. Thus the catcher normally is biased into engagement with the film 1 by the spring 2a, and out of engagement with the film 1 by the leaf spring 5 acting upon the finger 4. The leaf spring 5 is stronger than the helical spring 2a, and accordingly the catcher 2 will move into engagement with the film 1 only when released by the spring 5.

To effect engagement of the catcher 2 with the film 1, means are provided for disabling or nullifying the effect of spring 5 according to a certain scheme. This includes a release lever 9 which is secured on a shaft 10 and rotatable therewith, and a cam lever 11 connected with the release lever 9 and adapted to turn the shaft 10. Movement of the cam lever 11 in the direction of the arrow 12 turns the release lever 9 downwardly and presses it against the leaf spring 5. This disables the leaf spring 5 and permits the helical spring 2a to bias the catcher 2 into engagement with the perforations in the film 1. As long as the cam lever 11 is not turned in the direction of the arrow 12, the release lever 9 remains in its upper position, and the leaf spring 5 restrains the catcher 2 from engaging the film perforations.

Periodic disabling of the leaf spring 5 so as to effect film engaging movement of the catcher 2 may be accomplished in several ways, but is attained according to the embodiment shown in FIGURE 1 through the use of a series of coaxial cam discs 13 mounted for rotation adjacent the cam lever 11. For clarity only one of the discs is shown as provided with cam lobes or surfaces 14 in FIGURE 1. It will be understood, however, that the others would normally have cam lobes or surfaces also, with the exception of a disc corresponding to zero frequency of frame change. As will be described hereinafter, the film projector according to the invention has shutter means for interrupting a light beam at a constant frame projection frequency, as is well known in the art. Each disc having cam surfaces or lobes would carry such a number of cam surfaces or lobes as to be operable upon selection to actuate the cam lever 11 at a predetermined aliquot part of the light interruption frequency or the catcher reciprocation frequency, which term includes the frame projection frequency or the catcher reciprocation frequency themselves. Thus at least one disc would carry a number of cam surfaces or lobes such as to actuate the cam lever 11 at each light interruption, which would provide the maximum frequency of frame change. The remaining discs 13 would each carry such a number of cam surfaces or lobes as to be operable upon selection to actuate the cam lever 11 at lower frequencies, for instance, at every second light interruption, or at every third light interruption. Frame change frequency is dictated, of course, by the product of the revolutions per unit time performed by a cam disc and the number of cam lobes on the disc. As will be described further, the invention contemplates that the series of cam discs 13 be connected with the shutter to attain the necessary synchronization with the light interruptions, although the rotational speeds need not be identical.

Through relative axial displacement between the cam lever 11 on the shaft 10 and the series of cam discs 13, the frequency of frame change may be varied as desired. This relative displacement may be attained through axial displacement of the series of cam discs, through axial displacement of the cam lever 11 on the shaft 10, or, as illustrated in FIGURE 1, by axial displacement of the shaft 10 itself and the cam lever 11 therewith in the directions indicated by the arrows 15.

Reverse film feed can be attained by providing a second reciprocating catcher 16 actuated by a helical spring 16a and a leaf spring 17, corresponding respectively to helical spring 2a and leaf spring 5. As illustrated in FIGURE 1, the cam disc series includes two groups, group 13b for use during forward feed and group 13a for use during reverse feed. In each instance the number of cam discs corresponds to the desired number of frame change frequencies for each feed direction, and the configurations of the discs correspond to the particular frequencies desired. As illustrated, the lever 11 is displaced axially with the shaft 10. Consequently displacement of the shaft 10 from the forward feed discs to the reverse feed discs simultaneously carries the levers 11 and 9 from their operative position above the spring 5 to an operative position above the spring 17, whereby the forward catcher 2 is rendered inoperative and the backward catcher 16 is rendered operative to feed the film in a reverse direction at any selected frequency of frame change.

Each catcher is provided with an inclined face, as illustrated at 18 on catcher 2. The purpose of the inclined faces is to lower the accuracy requirements of the feed mechanism. As a result, the need for retracting the catcher from the film perforations at any precise moment is avoided, and the catcher will in fact slide out of the film during its return movement due to the inclination of the face 18. During this return movement the film will not be displaced where the bias of the helical spring 2a in the direction of the arrow 8 is so adjusted as to provide that the catcher is lifted upwardly by the small force resulting when it moves in a direction opposite to its feed direction. Moreover, when the catcher is in engagement with a perforation of the film and moving in a direction to advance the film, the total effect of the friction between the catcher and the film and the bias of the spring 2a is greater than the counter bias of the spring 5, and thus the spring 5 will not pull the catcher out of the film perforation during film advance even if the cam lever 11 is shifted to a second disc which does not have a cam lobe at the corresponding lateral position, so that the release lever 9 will be free to move upwardly. Thus momentary changes from one frequency to another are possible during mid-stroke of the film feed without the risk of there being only a partial frame change because the mechanism will complete the last film feed movement prompted by the first cam disc before starting a frame change frequency characteristic of the second cam disc.

Reciprocation of the catchers 2 and 16 in a film feeding direction may be accomplished in any of several ways. It is essential only that the catchers move in synchronism with the shutter so that film feed will occur only during light interruptions. According to the embodiment of FIGURE 1 the shutter system includes a shaft 19 rotated in the direction of the arrow 20 at a constant speed by the motor 19a. A shutter 21 is secured to the shaft 19 and accordingly rotates therewith at constant speed. A light source 22 and an optical device 23 for projecting a light beam on the film may be seen also in FIGURE 1. The shaft 19 carries two eccentric discs 24 and 25 which are disposed at 180° displacement from one another. Each disc cooperates with arms 26 and 27 mounted on a shaft 28. The arms 26 and 27 are also subjected to the bias action of spring 29 which urges the arms against the discs 24 and 25. The free end of arm 26 is connected with catcher 16, and the free end of arm 27 is connected with the catcher 2 such that as the shaft 19 rotates, a periodic reciprocating movement is imparted to each of the catchers in a film feed direction in synchronism with the rotational movement of the shutter 21. Means indicated schematically at 26a and 27a are provided for guiding the catchers in their respective film feed directions.

Synchronous rotation of the cam disc series 13 with the shaft 19 is attained through the driving disc 29a connected by means of the belt 30 with a driven disc 31 on the shaft 32 which carries the cam disc series 13. The shaft 32 is thus rotated in synchronism with the shutter in the direction of the arrow 33.

The operation of the system shown in FIGURE 1 will be apparent from the foregoing description. In summary, the shutter 21 is rotated at a constant speed so as to interrupt the light beam from light source 22 at a constant frequency. The catchers 2 and 16 are reciprocated back and forth in a direction to advance the film and at a frequency so as preferably to provide for advancing the film once during each light interruption. However, the frequency of frame change, or the rate at which the film is advanced, is governed by the speed and configuration of the particular cam disc with which the lever 11 cooperates. As pointed out previously, preferably one of the cam discs is so constructed as to effect engagement of the catchers with the film during each light interruption, and others of the discs are constructed so as to effect engagement of the catchers with the film at lower frequencies, that is, at every second light inerruption, or at every third light inerruption, etc. In the particular embodiment shown in FIGURE 1 this is accomplished by actuating or disabling the leaf spring 5 at predetermined intervals. Variations in the frequency of frame change are achieved by bringing the lever 11 into cooperative relationship with different cam discs. Reverse film feed is achieved by moving the lever 11 into cooperative relationship with any one of the discs of group 13a and with the leaf spring 17. At least one cam disc is constructed with a smooth configuration so as to avoid actuation of the lever 11 or the leaf springs, thus resulting in still projection without in any manner varying the rate or direction of movement of the shutter 21 or the catchers 2 and 16.

In order to provide for the film to be reeled on and off continuously and under proper tension during the displacements, special provision is made in the supply and take-up or reeling mechanism. The embodiment of this mechanism which is shown in FIGURES 2 and 3 also provides for instantaneous film take-up upon reversal of the film feed direction, and without necessitating a drive shift from one film reel to the other. In the arrangement of FIGURES 2 and 3, the film 1 moves from an upper reel 60 through the intermittent feed mechanism, represented schematically at 61, and onto a lower reel 62. The film will move at an assigned speed in either direction as indicated by the arrows 63. The reels 60 and 62 are continuously tendency driven in the direction of the arrows 66 and 67 such that each reel tends to charge itself with the film. Rotation of the reels is effected through friction clutches 64 and 65 which are driven continuously from the projector motor 19 by transmission belts 74 and 74′, respectively.

Friction regulators 68 and 69 provide for adjusting the degree of frictional engagement mutually between each reel and the projector motor in response to changes in film tension between each reel and the intermittent feed mechanism. The respective regulators are subjected to turning forces in the directions of the arrows 68a and 69a respectively, for instance, by means of springs. Small film guide rollers 68b and 69b are mounted at the outer ends of the respective regulators 68 and 69.

FIGURE 3 illustrates in detail an arrangement by which the regulators ensure that the film will be wound or unwound at proper rates so as to maintain substantially constant tension on the film between the reels. In practice each of the rollers 68b and 69b is mounted in the plane respectively of its reel 60 or 62, but for purposes of illustration reel 60 and roller 68b in FIGURE 3 are shown in different planes. In FIGURE 3 the two plates or discs 72 and 73 comprise a friction clutch through which the projector motor 19a and the reel 60 or a reel spindle or support are operatively connected, the reel 60 or a reel spindle or support being coupled to the disc 73 and the disc 72 being rotated in the direction of arrow 66 of FIGURE 2 by means of transmission belt 74. The inner end of the regulator 68 carries a screw 70 which engages stud 71 on the disc 72. Axial adjustment of the screw increases or decreases the pressure bearing on the stud, and, in turn, the pressure exerted on the disc 72 of the friction clutch. Consequently if for some reason film above the intermittent feed mechanism 61 undergoes decrease in tension, the regulator 68 will turn in the direction of arrow 68a, and the screw 70 will move inwardly of the stud 71 to increase the pressure exerted on the disc 72 through the stud. The consequent adjustment in the degree of frictional engagement between the discs 72 and 73 will result in a tendency on the part of the reel 60 to wind up film in the direction of the arrow 66, and thus an increase in the tension exerted on the film above the mechanism 61 will occur. A similar effect would occur if for some reason the film between the mechanism 61 and the reel 62 were to undergo a decrease in tension, such as where the frequency of frame change remains for a time at a high value. In much the same manner, upon an increase in tension in the film between reel 60 and intermittent feed mechanism 61, regulator 68 would move in a counterclockwise direction, thus moving discs 72 and 73 apart so as completely to disengage the drive from the reel 60 and permit the reel 60 to unwind freely. Since both regulators operate simultaneously, film tension on each side of the mechanism can be maintained within predetermined limits. Since the film tension can be so controlled, upon reversal of the direction of film feed through the intermittent feed mechanism 61 there will be no delay in film take-up by the reel toward which the film is then being fed. Also, it will be noted that there is no drive shift from one reel to another upon reversal of the direction of film feed, but rather either roller is capable of substantially instantaneously shifting from a winding to an unwinding operation since each is continuously tendency-driven in the take-up direction.

Inasmuch as the screw 70 undergoes only small angular changes, it may conveniently be in the form of a multi-thread screw of the high pitch type. Or it may be constructed as merely a short section of a thread turn, for example, in the form of a stud sliding in a groove of corresponding pitch. This pitch may be varied along the groove.

Figure 5:
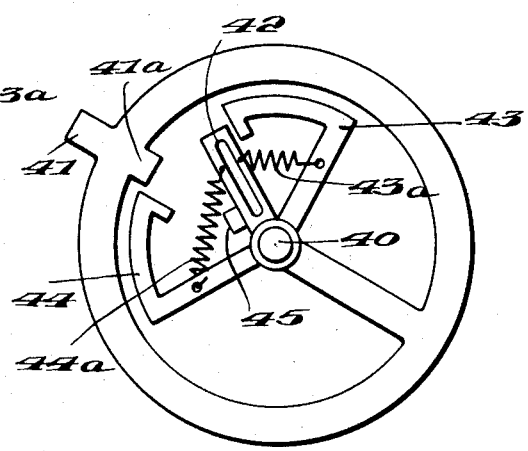

During relative axial displacement of the cam disc series 13 and the cam lever 11, there is a risk of damage to one or the other of the elements should they engage laterally, especially when the cam discs are not undergoing rotation. This risk can be obviated if the cams and/or the cam lever are formed with inclined lateral edge portions so as to permit the tip of the cam lever to slide laterally onto the cams. With such a construction, however, it is necessary that the length of the cam disc array be extended, and of course the effective glide surface of each cam is usually diminished. FIGURES 4 and 5 illustrate an arrangement which pervents damage to the cam lever mechanism, yet does not require extension of the cam disc array. Arranged for independent rotation on a shaft 40 are an adjustment lever 41 having a finger 41a, lever 42, and two locking arms 43 and 44 which are connected to the lever 42 by means of tension springs 43a and 44a. The lever 42 is connected with the shaft 10 carrying the cam lever 11 by means of a pin and slot connection which serves to displace the shaft 10 for variation of the frequency of frame change.

The locking arms 43 and 44 abut the finger 41a from each side, and the finger is in effect clamped between them. When the lever 41 is turned to one side or the other the engagement of the lever 42 with the finger 41a through the arms 43 and 44 and their associated springs will cause the lever 42 to move simultaneously and commensurate with the movement of the lever 41. However, should the lever 42, and the elements 10 and 11 associated therewith, encounter an obstacle during movement of the lever 41 to one side or the other, the mechanism will respond by controlling further displacement of the elements until the obstacle has been removed. This is illustrated schematically in FIGURE 5 in the case of a left-hand movement of the lever 41. For purposes of illustration, the lever 42 is shown as having encountered an obstacle 45. The lever 41 continues movement to the left as the lever 42 remains at the obstacle 45. Thus in practice where the cam lever 11 encounters a moving cam on, for example, the disc 14, the mechanism would respond by controlling further displacement of the lever 11 until the moving cam had detached itself. The force acting on the lever 11 would be no larger than the force of the spring 44a. By the same token, force acting on the lever 42 during movement of the lever 41 in the right-hand direction is limited to the action of the spring 43a.

Preferably the lever 41 is provided with marked rest positions so as to prevent the lever 11 from becoming stalled between two cam discs, and to ensure that the lever 11 will move from one disc to another with the greatest facility. Likewise, to facilitate frequency variation in the case of special frequencies such as a "normal frequency" and zero frequency, these may be given a special marking on the lever 41, such as through the use of a more pronounced rest position whereby the operator can easily feel out the position he desires. In the same way, transition from forward to backward drive can be made more discernible through the use of special rest positions for the adjustment lever.

Figure 6:
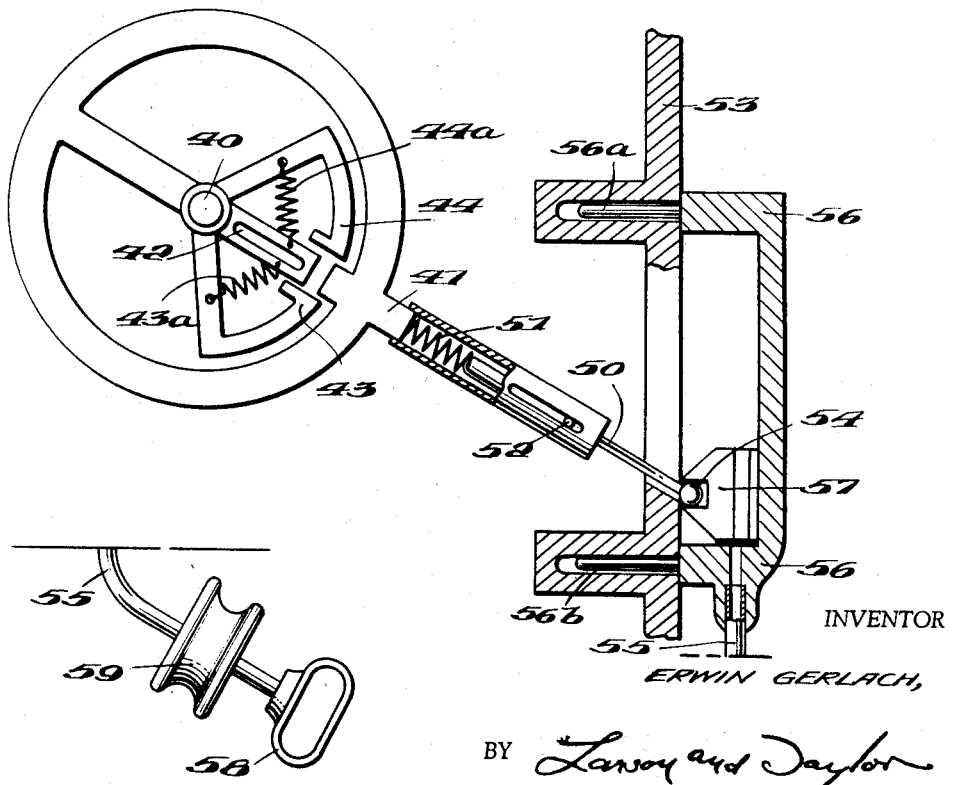

A suitable arrangement for frame change frequency variation in the projector is illustrated in FIGURE 6. In this arrangement the lever 41, the adjustment of which determines the frame change frequency, is provided with a radially displaceable rod 50 which slides within an extension of lever 41 by means of a pin 52 engaged in a slot defined in the extension, and the rod 50 is urged outwardly by a spring 51. The rod 50 is movable in a slot in the projector cover 53, and on the end thereof outside the cover the rod has an adjustment nob 54 through which the frame change frequency is varied by upward or downward movement of the rod 50 in the cover slot. A plug-in member 56 is used to cover the slot and has a guide member 57 within it which is movable upwardly and downwardly by means of a well known type of flexible cable assembly generally indicated at 55 connected therewith. The guide member 57 is recessed to carry the adjustment nob 54 engaged within it. The plug-in member 56 is engaged with the projector cover in the manner of an ordinary plug connector by means of two guide pins 56a and 56b adapted to fit in corresponding sockets in the projector cover. The guide member 57 has inclined rim portions, and accordingly regardless of the relative disposition of the nob 54 and the guide member 57 when the plug-in member 56 is attached to the projector cover, the nob may be quickly engaged with the guide member by moving the latter through a few upward and downward strokes with the plug-in member. A thumb eyelet 58 is provided at the free end of the cable assembly 55, as is a roller 59 adapted for engagement by the index and second fingers. Thus the guide member can be actuated either by pressure or by pull.

The frame change frequency may be controlled by other than manual means, for example through the use of mechanical means actuated by markings located along the edges of the film, in conventional manner. Likewise, other elements may take on a different character, as where the cam discs are provided with recesses in lieu of cam surfaces or lobes, and the cam free portions of the discs then serve to effect forward feed of a frame. Obviously it is also possible to utilize one and the same cam disc array for forward and backward feed if means are provided for switching the mechanism over from one feed to the other. Also, although I have shown my film reeling or take-up system used in conjunction with my new variable rate intermittent feed mechanism, it will be appreciated by those skilled in the art that this reeling or take-up system could be used in combination with any conventional feed mechanism.

Although I have shown and described certain specific embodiments of my invention, I am fully aware that many modifications thereof are possible, and my invention, therefore, is not to be restricted to the precise details of construction shown and described, but is intended to cover all modifications coming within the scope of the appended claims.

I claim:
1. A film projector comprising in combination:
  (1) a source of light;
  (2) means for intermittently moving a motion picture film past said source of light;
  (3) and shutter means for interrupting the light beam between the source of light and the film at a fixed frequency;
  (4) said means for intermittently moving the film comprising
     (a) a film catcher,
     (b) means mounting said catcher for back-and-forth reciprocation in a film advancing direction and in-and-out movement in a film engaging and disengaging direction,
     (c) drive means for reciprocating said catcher in said back-and-forth direction at said fixed frequency,
     (d) in-and-out cam means,
     (e) means for rotating said in-and-out cam means in synchronism with said drive means,
     (f) follower means for effecting in-and-out movement of said catcher in response to rotation of said cam means,
     (g) said in-and-out cam means comprising a plurality of groups of camming surfaces for actuating said follower means in selectively different time relations with the back-and-forth movement of said catcher to vary the intermittent rate of film frame advance selectively between at least three frequencies selected from the group consisting of zero frequency and frequencies which are aliquots of said fixed frequency.
     (h) and means for relatively positioning different ones of said groups of camming surfaces into operative relationship with said follower means.

2. In a film projector having shutter means for interrupting a light beam at a constant frame projection frequency, selectively variable intermittent film feeding mechanism for feeding film through the projector comprising film engaging means, means connected with the shutter means to actuate the film engaging means in a film feeding direction during each interruption of the light beam, means actuating the film engaging means in a film engaging direction, a flexible member operatively disposed to restrain the film engaging means from moving in said film engaging direction, means for disabling the flexible member, means including a plurality of cam means each operable upon selection to actuate the disabling means at a different predetermined multiple of a light interruption to vary the film feeding rate, and means for causing relative selecting movement between the disabling means and the cam means whereby the frequency of frame change is varied by bringing the cam means having the required light interruption multiple into operative relation with the disabling means.

3. In a film projector having shutter means for interrupting a light beam at a constant frame projection frequency, intermittent film feeding mechanism comprising film engaging means, means connected with the shutter means to actuate the film engaging means in a film feeding and a film engaging direction during each interruption of the light beam, a flexible member operatively disposed to restrain the film engaging means from moving in said film engaging direction, a lever member mounted to operatively disable the flexible restraining member, means including a plurality of cam means each operable upon selection to actuate the lever member at a different predetermined multiple of a light interruption to vary the film feeding rate, and means for causing relative selecting movement between the lever member and the cam means whereby the frequency of frame change is varied by bringing the cam means having the required light interruption multiple into operative relation with the lever member.

4. In a film projector having shutter means for interrupting a light beam at a constant frame projection frequency, intermittent film feeding mechanism comprising a film catcher, means connected with the shutter means to actuate the catcher in a film feeding direction and in a film engaging direction during each interruption of the light beam, a leaf spring operatively disposed to restrain the catcher from moving in said film engaging direction, a lever member mounted to operatively disable the leaf spring, means connected with the shutter means including coaxial cam discs mounted for rotation adjacent the lever member and each operable upon selection to actuate the lever member at a predetermined multiple of a light interruption, and means for causing relative axial displacement between the lever member and the cam discs whereby the frequency of frame change is varied by bringing the cam disc having the required light interruption multiple into operation relative with the lever member.

5. A film projector according to claim 4 wherein the cam discs are disposed adjoining one another in coaxial arrangement, and the cams are bevelled for cooperative lateral engagement with the lever member upon relative axial displacement of the lever member and the cam discs.

6. In a film projector having shutter means for interrupting a light beam at a constant frame projection frequency, intermittent film feeding mechanism comprising first and second film engaging means for respectively forward and backward film feed directions, means connected with the shutter means to actuate each of the film engaging means in a film engaging direction and each simultaneously in its respective film feeding direction during each interruption of a light beam, means operatively restraining each of the film engaging means from moving in its respective film engaging direction, means for alternatively disabling the restraining means with regard to one or the other of the film engaging means, and cam means for selectively actuating said disabling means at different predetermined multiples of a light interruption to selective vary the rate of film feed, whereby the frequency of frame change in the respective film feeding direction can be varied while the frequency of frame projection remains constant.

7. In a film projector having means including a pair of reels for moving the film through a path therebetween, means for projecting a light beam across the film path, and shutter means for interrupting the light beam at a constant frame projection frequency, intermittent film feeding mechanism comprising means for engaging the film in its path between the reels, means connected with the shutter means to actuate the film engaging means in a film engaging direction and in a film feeding direction during each interruption of the light beam, means operatively restraining the film engaging means from moving in said film engaging direction, means for disabling the restraining means, cam means for selectively actuating the disabling means at different predetermined multiples of a light interruption to vary the film feeding rate whereby the frequency of frame change can be varied while the frequency of frame projection remains constant, and means for maintaining substantially constant tension on the film in its path between the reels.

8. A film projector according to claim 7 wherein the film moving means includes constant speed drive means for the reels, and said tension maintaining means includes friction clutch means operatively connecting each reel and the drive means and means for adjusting the degree of friction engagement mutually between each reel and the drive means in response to change in film tension between the reels.

9. A film projector according to claim 8 wherein the friction clutch means includes a pair of coaxial friction clutch plates and said friction adjusting means includes movable film guide means for each reel biased in the film tensioning direction and connected with one of the clutch plates associated with its reel to cause relative axial movement between said plates in response to change in film tension between the reels.

10. In a film projector having shutter means for interrupting a light beam at a constant frame projection frequency, intermittent film feeding mechanism comprising film engaging means, means connected with the shutter means to actuate the film engaging means in a film engaging direction and in a film feeding direction during each interruption of the light beam, means operatively restraining the film engaging means from moving in said film engaging direction, a lever member for disabling the restraining means, means including coaxial cam discs mounted for rotation adjacent the lever member and each operable upon selection to actuate the lever member at a predetermined multiple of a light interruption, and means for displacing the lever member along an axis extending parallel to the axis of the cam discs whereby the frequency of frame change is varied by bringing the cam disc having the required light interruption multiple into operative relation with the lever member, said lever displacing means including means responsive to lateral engagement between the lever and a moving cam to control lever displacement until the moving cam has detached itself.

11. A film projector according to claim 10 wherein the lever member is mounted on an axially displaceable shaft biased in opposing axial directions by a pair of resilient actuator members each operable to displace the shaft upon disabling of the other.

12. A film projector according to claim 4 wherein the catcher and the lever are pivotally mounted so that the film advancing ends thereof move substantially at right angles to the plane of the film and the leaf spring is mounted to engage a laterally extending finger on the catcher.

13. An intermittent film feeding mechanism for a film projector comprising:
(1) a film catcher;
(2) means mounting said catcher for back-and-forth reciprocation in a film advancing direction and in-and-out movement in a film engaging and disengaging direction relative to a strip of film to advance the film intermittently through the projector;
(3) means for reciprocating said catcher back-and-forth at a fixed frequency;
(4) and means for selectively effecting in-and-out movement of said catcher into and out of engagement with the film at any one of a plurality of frequencies, whereby the film can be intermittently advanced through the projector at selected rates, said means for selectively effecting in-and-out movement of said catcher comprising cam means having a plurality of different series of cam surfaces thereon, means for rotating said cam means in synchronism with said means for reciprocating said catcher, means actuated by a selected one of said series of cam surfaces for effecting said in-and-out movement of said catcher in response to rotation of said cam means, and means for effecting relative shifting movement between said last mentioned means and said cam means so as to permit actuation of said last mentioned means by any selected one of said series of cam surfaces, one of said series of cam surfaces being of a continuous smooth shape so as to prevent movement of said catcher into engagement with said film.

14. An intermittent film feeding mechanism for a film projector comprising:
(1) a film catcher;
(2) means mounting said catcher for back-and-forth reciprocation in a film advancing direction and in-and-out movement in a film engaging and disengaging direction relative to a strip of film to advance the film intermittently through the projector;
(3) means for reciprocating said catcher back-and-forth at a fixed frequency;
(4) cam means for selectively effecting in-and-out movement of said catcher into and out of engagement with the film at any one of a plurality of frequencies, whereby the film can be intermittently advanced through the projector at selected rates;
(5) and means cooperating with said last mentioned means for reversing the direction in which the film advances intermittently through the projector during continuous operation of said means for reciprocating said catcher back-and-forth.

15. A film projector comprising in combination:
(1) a source of light;
(2) means for intermittently moving a motion picture film past said source of light;
(3) and shutter means for interrupting the light beam between the source of light and the film at a fixed frequency;
(4) said means for intermittently moving the film comprising
(a) a film catcher,
(b) means mounting said catcher for back-and-forth reciprocation in a film advancing direction and in-and-out movement in a film engaging and disengaging direction,
(c) drive means for reciprocating said catcher in said back-and-forth direction at said fixed frequency,
(d) in-and-out cam means,
(e) means for rotating said in-and-out cam means in synchronism with said drive means,
(f) follower means for effecting in-and-out movement of said catcher in response to rotation of said cam means,
(g) said in-and-out cam means comprising a plurality of groups of camming surfaces for actuating said follower means in selectively different time relations with the back-and-forth movement of said catcher to vary the rate of film advance,
(h) and means for relatively positioning different ones of said groups of camming surfaces into operative relationship with said follower means,
(i) said in-and-out cam means including a section of continuous dwell surface for maintaining said follower member substantially motionless so as to effect still projection.

16. An intermittent film feeding mechanism for a film projector comprising a film catcher; means mounting said catcher for back-and-forth reciprocation in a film advancing direction and an in-and-out movement in a film engaging and disengaging direction relative to a strip of film to engage and advance the film intermittently through the projector; means for reciprocating said catcher back-and-forth at a fixed frequency; and cam means for selectively effecting movement of said catcher into and out of engagement with the film at any selected one of a plurality of frequencies and varying the film advancement while said catcher is reciprocating back-and-forth at said fixed frequency.

17. An intermittent film feeding mechanism for a film projector as claimed in claim 16 wherein said cam means selectively effects movement of said catcher into and out of engagement with the film at a plurality of frequencies selected from the group consisting of said fixed frequency, fractions of said fixed frequency, and zero frequency.

18. An intermittent film feeding mechanism for a film projector comprising:
 (1) a film catcher,
 (2) means mounting said catcher for back-and-forth reciprocation in a film advancing direction and in-and-out movement in a film engaging and disengaging direction relative to a strip of film to engage and advance the film intermittently through the projector,
 (3) means for reciprocating said catcher back-and-forth at a fixed frequency, and
 (4) means for selectively effecting in-and-out movement of said catcher into and out of engagement with the film at any selected one of a plurality of frequencies whereby the film can be intermittently advanced through the projector at selected rates, said means for selectively effecting in-and-out movement of said catcher comprising cam means having a plurality of different series of cam surfaces thereon, means for rotating said cam means in synchronism with said means for reciprocating said catcher, means actuated by a selected one of said series of cam surfaces for effecting said in-and-out movement of said catcher in response to rotation of said cam means, and means for effecting relative shifting movement between said last mentioned means and said cam means while said cam means are rotating so as to permit actuation of said last mentioned means by any selected one of said series of cam surfaces while the feed mechanism is in operation.

19. An intermittent film feeding mechanism for a film projector comprising:
 (1) a film catcher,
 (2) means mounting said catcher for back-and-forth movement in a film advancing direction and in-and-out movement in a film engaging and disengaging direction, during which movements the catcher intermittently engages and advances a strip of film through the projector,
 (3) drive means for reciprocating said catcher in said back-and-forth direction at a fixed frequency, and
 (4) means for imparting in-and-out movements to said catcher in selectively different time relations with the back-and-forth movements thereof to vary the rate of film advance and including
  (a) first in-and-out cam means for effecting in-and-out movement of said catcher at a frequency equal to said fixed frequency in time relation with said back-and-forth reciprocation of said catcher,
  (b) second in-and-out cam means for effecting in-and-out movement of said catcher at at least one other frequency which is an aliquot part of said fixed frequency in time relation with said back-and-forth reciprocation of said catcher,
  (c) means for rotating each of said cam means in synchronism with said drive means, and
  (d) means for selectively rendering said cam means operative to effect in-and-out movement of said said catcher during continuous back-and-forth reciprocation of said catcher and during continuous rotation of said cam means.

20. An intermittent film feeding mechanism as set forth in claim 19 further comprising means for reversing the direction of film advancing during continuous operation of said drive means and in the same drive direction thereof.

21. A selectively variable intermittent film feeding mechanism for a film projector comprising:
 a film catcher,
 means mounting said catcher for back-and-forth movement in a film advancing direction and in-and-out movement in a film engaging and disengaging direction relative to a film to advance the film through the projector,
 means for moving said catcher back and forth,
 cam means rotatable at constant speed, and means including said cam means coacting with said catcher for selectively effecting in-and-out movement of said catcher at different frequencies and for selectively unlimited time periods at each selected frequency during constant speed rotation of said cam means to effect advancement of film through the projector at selectively different rates and for selectively unlimited time periods at each rate.

22. An intermittent film feeding mechanism for a film projector comprising:
 film advancing means for advancing film through the projector,
 cam means,
 drive means for rotating said cam means at constant speed, and
 means including said cam means coacting with said film advancing means for selectively rendering said film advancing means operative to advance a film through the projector at selected rates during continuous operation of said drive means and during constant speed rotation of said cam means.

23. An intermittent film feeding mechanism for a film projector as claimed in claim 22 wherein said film advancing means comprises means for advancing film through the projector is forward or reverse direction, further including:
 means for selectively rendering said film advancing means operative to advance film through the projector in forward or reverse directions during continuous operation of said drive means.

24. An intermittent film feeding mechanism for a film projector comprising:
 a film catcher,
 means mounting said catcher for back-and-forth movement in a film advancing direction and in-and-out movement in a film engaging and disengaging direction relative to a strip of film,
 means for reciprocating said catcher back and forth,
 cam means rotatable at constant speed and having at least two different series of cam surfaces thereon, and
 means selectively engageable with said series of cam surfaces during continuous rotation of said cam means and during back-and-forth reciprocation of said catcher for selectively effecting in-and-out movement of said catcher at different frequencies.

25. An intermittent film feeding mechanism for a film projector comprising:
 a film catcher,
 means mounting said catcher for movement back-and-forth in a film advancing direction and in-and-out in a film engaging and disengaging direction relative to a strip of film, means for reciprocating said catcher back and forth at a constant frequency, cam means rotatable at a constant speed defining a first annular surface comprising a series of cam surfaces and a second smooth annular surface, and means selectively engageable with said first and second annular surfaces during constant speed rotation of said cam means and while said catcher is reciprocating back and forth at said constant frequency for selectively effecting in-and-out movement of said catcher at a predetermined moving frequency and at zero frequency respectively.

26. An intermittent film feeding mechanism for a film projector as claimed in claim 25 wherein said cam means comprise a pair of coaxial discs having peripheral surfaces defining said first and second annular surfaces.

References Cited

UNITED STATES PATENTS

| | | | |
|---|---|---|---|
| 1,786,917 | 12/1930 | Oehmichen | 242—75.5 |
| 1,833,371 | 11/1931 | Owens | 352—138 |
| 2,094,581 | 10/1937 | Bundick et al. | 242—55.11 |
| 2,173,230 | 9/1939 | Kellogg | 352—189 |
| 2,280,737 | 4/1942 | Alburger | 226—49 |
| 2,390,389 | 12/1945 | Redler | 352—180 |
| 2,601,181 | 6/1952 | Thevenaz | 352—59 X |
| 2,649,836 | 8/1953 | Clapp | 352—29 X |

FOREIGN PATENTS

| | | |
|---|---|---|
| 854,768 | 1/1940 | France. |
| 319,644 | 9/1929 | Great Britain. |
| 449,137 | 6/1936 | Great Britain. |
| 546,044 | 6/1942 | Great Britain. |

JULIA E. COINER, *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,007             September 17, 1968

Erwin Gerlach

It is certified that error appears in the above identified patent and that said Letters Patent are hereby corrected as shown below:

Column 7, lines 59 and 60, "frequency." should read -- frequency, --. Column 8, line 59, after "direction" insert -- at said constant frequency --; line 67, "selective" should read -- selectively --. Column 12, line 10, "advancing" should read -- advance --; line 29, "unlimited" should read -- variable --; line 31, "An" should read -- A selectively variable --; line 41, "selected rates" should read -- selected different rates and for selectively unlimited time periods at each rate --; line 47, "is" should read -- in --; same line 47, "direction" should read -- directions --.

Signed and sealed this 10th day of March 1970.

(SEAL)

Attest:

Edward M. Fletcher, Jr.            WILLIAM E. SCHUYLER, JR.

Attesting Officer                 Commissioner of Patents

Disclaimer 3,402,007.—*Erwin Gerlach*, Stockholm, Sweden. FILM FEEDING MECHANISM. Patent dated Sept. 17, 1968. Disclaimer filed Nov. 8, 1971, by the assignee, *Eastman Kodak Company*.

Hereby enters this disclaimer to claims 16 and 21 of said patent.

[*Official Gazette February 29, 1972.*]